(12) United States Patent
Chen et al.

(10) Patent No.: US 8,663,803 B2
(45) Date of Patent: Mar. 4, 2014

(54) VARNISH COMPOSITION, AND PRE-IMPREGNATED MANUFACTURE THEREOF

(75) Inventors: Li-Chun Chen, Taoyuan (TW); Chun-Chieh Huang, Taoyuan (TW)

(73) Assignee: ITEQ Corporation, Taoyuan (TW)

( * ) Notice: Subject to any disclaimer, the term of this patent is extended or adjusted under 35 U.S.C. 154(b) by 233 days.

(21) Appl. No.: 12/955,382

(22) Filed: Nov. 29, 2010

(65) Prior Publication Data

US 2012/0136094 A1 May 31, 2012

(51) Int. Cl.
- *B32B 27/38* (2006.01)
- *B32B 27/04* (2006.01)
- *B32B 27/20* (2006.01)
- *B32B 27/26* (2006.01)
- *C08L 63/00* (2006.01)
- *C08L 63/04* (2006.01)
- *B32B 15/092* (2006.01)
- *C08G 59/26* (2006.01)
- *C08G 59/32* (2006.01)
- *C08G 59/38* (2006.01)
- *C08G 59/40* (2006.01)
- *C08G 59/42* (2006.01)

(52) U.S. Cl.
USPC ........ 428/413; 428/297.4; 428/901; 523/427; 523/428; 523/429; 523/433; 523/451; 525/525

(58) Field of Classification Search
USPC ............. 428/297.4, 413, 414, 415, 416, 417, 428/418, 901; 523/427, 428, 429, 433, 451; 525/523, 524, 525
See application file for complete search history.

(56) References Cited

U.S. PATENT DOCUMENTS

| 4,066,628 | A | * | 1/1978 | Ashida et al. | 528/55 |
| 2010/0240816 | A1 | * | 9/2010 | Liao et al. | 524/384 |
| 2011/0037028 | A1 | * | 2/2011 | Valette et al. | 252/500 |
| 2012/0095133 | A1 | * | 4/2012 | Vyakaranam et al. | 523/435 |

FOREIGN PATENT DOCUMENTS

| JP | 2000239496 A | * | 9/2000 | C08L 63/00 |
| WO | WO 2008144252 A1 | * | 11/2008 | C08G 18/00 |
| WO | WO 2009055666 A1 | * | 4/2009 | C08G 18/00 |
| WO | WO 2011005925 A1 | * | 1/2011 | C08L 63/00 |

OTHER PUBLICATIONS

Machine translation of JP 2000239496 A, provided by the JPO website (no date).*

* cited by examiner

*Primary Examiner* — Michael J Feely

(74) *Attorney, Agent, or Firm* — Muncy, Geissler, Olds & Lowe, PLLC

(57) ABSTRACT

A varnish composition includes composition (A): an epoxy resin, composition (B): a hardener, composition (C): an accelerator, composition (D): phosphor-containing flame retardant, and composition (E): fillers, wherein composition (A) includes composition (A-1): phosphor-containing epoxy resin, phosphor-containing and silicon-containing epoxy resin, or a mixture thereof; composition (A-2): dicyclopentadiene epoxy resin; and composition (A-3): oxazolidone epoxy resin.

9 Claims, No Drawings

VARNISH COMPOSITION, AND PRE-IMPREGNATED MANUFACTURE THEREOF

BACKGROUND OF THE INVENTION

1. Field of the Invention

The present invention relates to a varnish composition, more particularly to a varnish composition for manufacturing pre-impregnated materials with improved and balanced physical characteristics.

2. Description of Related Art

Modern Printed Circuit Boards (PCB) are often made by laminating and curing/hardening pre-preg (pre-impregnated) materials, copper clad laminates (CCL), or copper films. Pre-impregnated materials (pre-pregs) are reinforcement fibers or fabrics impregnated with pre-catalyzed resin system. For example, one common way of pre-preg manufacture is by dipping glass fabrics into a varnish composition and then curing/hardening the fabrics to form thin layered prepreg. These reinforced composite fabric materials are suitable and widely applied to many different fields of technology, one of which is the manufacture of PCBs, due to their thinness, light-weight, and high mechanical strength. However, as the environmental protection laws become more and more restricted (such as RoHS, WEEE), lead-containing soldering materials are gradually required to be phased out in favor of lead-free counterparts for electronic application of all ranges. As the processing temperature for the lead-free soldering materials is in general 30 to 40° C. higher than that of the lead-containing solder, it is necessary to improve the heat-resisting property of the pre-preg material to improve its suitability for PCBs applications.

Furthermore, for environmental protection reasons, tighter regulations gradually forbid the use of widely used yet poisonous halogen-containing materials as flame retardants. In replacement, halogen-free PCB is widely used in electronic products. To compensate for the absence of halogen-based flame retardants, phosphorus or phosphorus-containing molecules or compounds are added to pre-preg materials to enhance the anti-flammability/fire-retardancy of the PCB. Traditionally, the varnish composition can contain either a primary resin having a phosphorus-containing compound or a hardener containing a phosphorus-containing compound. Alternatively, a phosphorus-containing compound may be separately added into the varnish composition to improve the anti-flammability of the PCB.

Moreover, as being widely used in various applications, the physical and chemical characteristics of modern pre-preg materials, such as the vitrification/glass transition temperatures (Tg), heat-resisting/anti-flaming characteristics, and moisture absorption properties, is preferable to possess better flexibility and adaptability to meet various specifications. Furthermore, for the application in PCB manufacturing, the varnish composition is required to have high machinability when subjected to drilling or other mechanical processing procedures. Therefore, the present disclosure provides a varnish composition suitable for manufacturing pre-preg composite and substrate thereof having more balanced and beneficial properties that can meet the requirement of a wide range of applications.

Therefore, in view of these difficulties, the inventor has developed ways to overcome these difficulties to provide a dependable product with reliable results in production; the present invention addresses these difficulties and allows reliable production at high speed and overcomes the above problems.

SUMMARY OF THE INVENTION

The present invention provides a varnish composition which is used for manufacturing prepreg(s) and substrate(s) having improved characteristics. For example, the manufactured prepreg(s) and substrate(s) have lower Tg, Dk (dielectric constant), and Df (dissipation factor), and further have improved anti-flammability/flame resistance. Moreover, the manufactured prepreg/substrate has improved machining properties.

The present invention provides a varnish composition. The varnish composition includes composition (A): an epoxy resin, composition (B): a hardener, composition (C); an accelerator, composition (D): phosphorus-containing flame retardant, and composition (E): fillers, wherein composition (A) includes composition (A-1): phosphorus-containing epoxy resin, phosphorus-containing and silicon-containing epoxy resin, or a mixture thereof; composition (A-2): dicyclopentadiene epoxy resin; and composition (A-3): oxazolidone epoxy resin.

The present invention further provides a varnish composition which, when used properly will yield a prepreg manufactured by dipping a composite fabric, such as glass fiber, into the varnish composition then curing and drying the dipped fabrics.

The present invention still further provides a substrate by laminating the prepreg into the substrate for a PCB.

The P-containing epoxy, P-containing and Si-containing epoxy, or the mixture thereof is used to be combined with another epoxy resin as the main epoxy resin. The main epoxy resin is mixed with SMA to form the varnish composition of the present invention. The prepreg manufactured by dipping the fiber into the varnish composition has improved anti-flammability, low moisture absorption and the substrate manufactured by laminating the prepregs has balancing properties.

In order to further understand the techniques, means, and effects the present invention takes for achieving the prescribed objectives, the following detailed descriptions and appended drawings are hereby referred, such that, through which, the purposes, features, and aspects of the present invention can be thoroughly and concretely appreciated; however, the appended drawings are provided solely for reference, demonstration, clarity and illustration, without intent that they will be used for limiting the present invention.

DETAILED DESCRIPTION OF THE PREFERRED EMBODIMENTS

The present invention provides a varnish composition which includes composition (A): an epoxy resin; composition (B): a hardener; composition (C): an accelerator; composition (D): phosphorus-containing flame retardant; and composition (E): fillers. The varnish composition of the instant invention is applied for manufacturing lamination(s) of printed-circuit board (PCB) and for improving the anti-flammability/flame resistance of the substrate. The composition ratio of the instant invention is further provided for achieving characteristics of high Tg (glass transition temperature), high anti-flammability and high machining properties. Still further, fillers are added to the varnish composition to manufacture prepregs with improved anti-flammability/flame resistance.

The compositions are introduced as follows. In an exemplary embodiment, the composition (A) at least has composition (A-1), composition (A-2), and composition (A-3). The composition (A-1) is phosphorus-containing (i.e., P-containing) epoxy resin, phosphorus-containing (i.e., P-containing) and silicon-containing (i.e., Si-containing) epoxy resin, or a mixture of the two above-mentioned resins. The phosphorus-containing epoxy resin of composition (A-1) can be an epoxy resin formed with a phosphorus-containing reactant selected from the group consisting of following formula 1, formula 2, or formula 3.

The formula 1 is shown as,

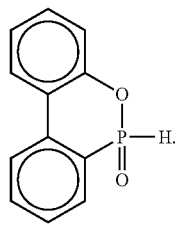

formula 1

The epoxy resin having formula 1 can be a side chain epoxy; in the exemplary embodiment, the side chain epoxy is a novolac epoxy resin. For example, an o-cresol novolac epoxy resin (CNE) linked with an organic ring in which one vertex of the ring is occupied, or formed by a phosphorus atom or phosphide. In a reference example, the side chain phosphorus-containing novolac epoxy is an o-cresol novolac epoxy resin linked with 9, 10-dihydro-9-oxa-10-Phosphaphenanthrene-10-oxide (DOPO) and is named as DOPO-CNE.

On the other hand, the epoxy resin may be a dual-epoxy resin, such as bisphenol A epoxy resin, bisphenol F epoxy resin, bisphenol S epoxy resin or bisphenol epoxy resin. Alternatively, the epoxy resin may be a multi-epoxy resin, such as phenolformaldehyde novolac epoxy resin (PNE), BNE or the mixture thereof.

The formula 2 is shown as,

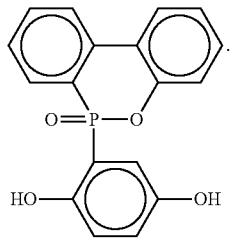

formula 2

The epoxy resin having formula 2 can be a side chain epoxy; in the exemplary embodiment, the side chain epoxy is a novolac epoxy resin. For example, an o-cresol novolac epoxy resin (CNE) linked with an organic ring in which one vertex of the ring is occupied, or formed by a phosphorus atom or phosphide. In a reference example, the side chain phosphorus-containing novolac epoxy is an o-cresol novolac epoxy resin linked with 10-(2,5-dihydroxyphenyl)-10h-9 oxa-10-phosphaphenanthrene-10-oxide (DOPO-HQ) and is named as DOPO-HQ-CNE.

The formula 3 is shown as,

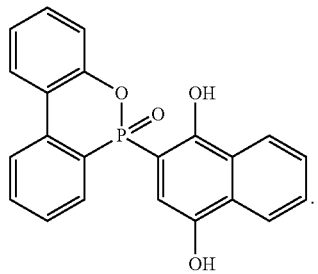

formula 3

The epoxy resin having formula 3 can be an o-cresol novolac epoxy resin (CNE) linked with DOPO-NQ. In other words, the phosphorus-containing epoxy resin is an o-cresol novolac epoxy resin linked with DOPO-NQ and is named as DOPO-NQ-CNE.

On the other hand, in the exemplary example, the phosphorus-containing and silicon-containing epoxy resin of composition (A-1) is an epoxy resin formed with a mixture of formula 1 and silicon, an mixture of formula 2 and silicon, or an mixture of formula 3 and silicon. For example, the epoxy resin having mixture of formula 1 and silicon can be an o-cresol novolac epoxy resin linked with DOPO-Si and is named as DOPO-Si-CNE. Similarly, the phosphorus-containing and silicon-containing epoxy resin of composition (A-1) can be an epoxy resin formed with a mixture of formula 2 and silicon and is named as DOPO-HQ-Si-CNE. The phosphorus-containing and silicon-containing epoxy resin of composition (A-1) can be an epoxy resin formed with a mixture of formula 3 and silicon and is named as DOPO-NQ-Si-CNE.

Therefore, the composition (A-1) can be phosphorus-containing epoxy resin, phosphorus-containing and silicon-containing epoxy resin, or a mixture thereof and is provided for improving the anti-flammability of the manufactured prepreg.

The composition (A-2) is a dicyclopentadiene epoxy resin (DNE). For example, the composition (A-2) can be the compound shown as:

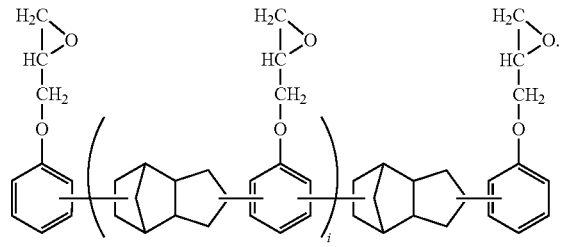

Formula 4

The composition (A-2) can be provided for improving the prepreg/substrate with low moisture absorption, and low (Dk)/dissipation factor (Df). The substrate having lower Dk/Df can be applied in high frequency application, such as wireless communication.

The composition (A-3) is an oxazolidone epoxy resin. For example, the composition (A-3) can be the compound shown as:

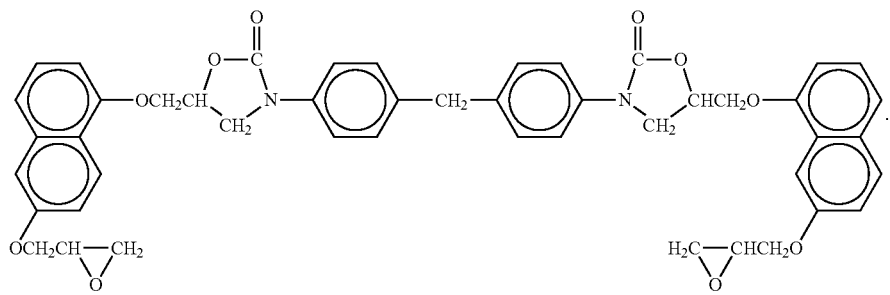

Formula 5

The composition (A-3) can be provided for improving the tenacity of the prepreg/substrate. Moreover, the combinability of the prepreg/substrate with another metal material is improved.

On the other hand, the composition (A) further includes composition (A-4): naphthalene epoxy resin. For example, the composition (A-4) can be naphthalene alkyl epoxy resin shown as:

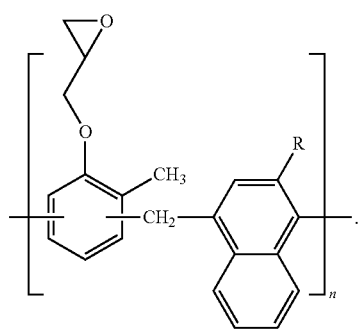

formula 6

The composition (A-4) has property of anti-flammability; therefore, the addition of the composition (A-4) can improve the anti-flammability of the prepreg/substrate. Furthermore, the addition of the composition (A-4) can reduce the amount of the phosphorus-containing epoxy resin of composition (A-1) and the phosphorus-containing flame retardant of composition (D) of higher cost so as to decrease the manufacturing cost.

The hardener of the composition (B) can be a polymer of styrene and maleic acid anhydride, a benzoxazine resin, or a mixture thereof. In the exemplary example, the polymer of styrene and maleic acid anhydride can be SMA which is formed by combining styrene and maleic anhydride in ratio of 3:1, 4:1, 6:1, 8:1. The hardener of the composition (B) may have the following characteristics: the Mw (weight-average molecular weight) is between 9000 and 15000; the Mn (number-average molecular weight) is between 3000 and 8000; the ratio of residual styrene is less than 0.2%, the ratio of residual Cl is less than 20 ppm; the ratio of residual maleic anhydride is less than 0.01%; and the ratio of residual metal, such as Na, Fe, Mg is less than 10 ppm.

On the other hand, the hardener of the composition (B) can be an epoxy resin with benzoxazine ring, such as benzoxazine resin (Bz) which is shown as following:

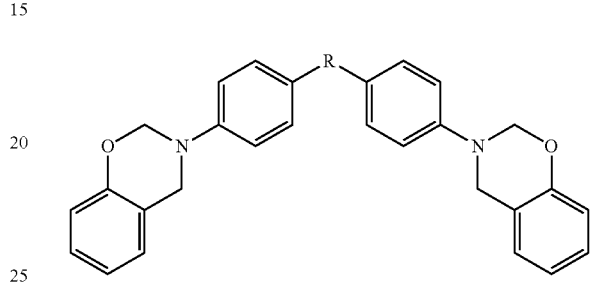

wherein "R" can be S, CH2,

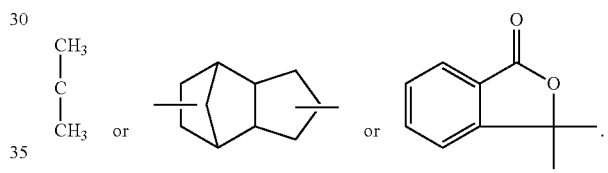

The hardener of the composition (B) can be a single hardener or a composite hardener combined of the two above-mentioned resins. The hardener of the composition (B) can be provided for increasing Tg and anti-flammability of prepreg/substrate and for decreasing the moisture absorption and Dk/Df of the prepreg/substrate.

On the other hand, the accelerator of composition (C) is used to control the curing action of the varnish composition coated on the glass fiber. For example, the accelerator can be 2E4MI, 2-methyl imidazole (2-MI), or 2-PI to control and to accelerate the curing rate of the varnish composition.

The phosphorus-containing flame retardant of composition (D) is used to improve the anti-flammability of prepreg/substrate. For example, the phosphorus-containing flame retardant can be the following compound or the mixture thereof.

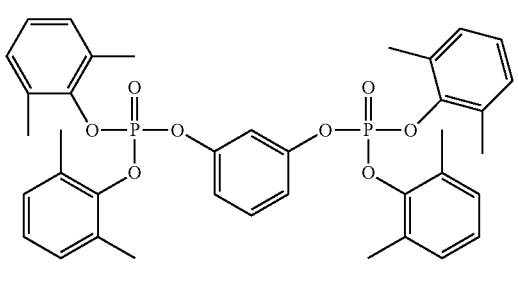

Aromatic polyphosphate

-continued

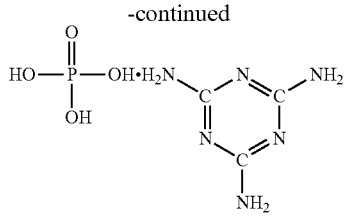

Melamine polyphosphate

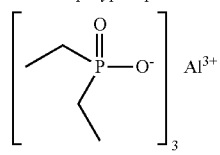

Diethyl phosphinic acid, aluninium salt

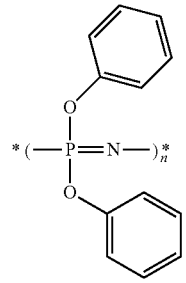

Phosphazene

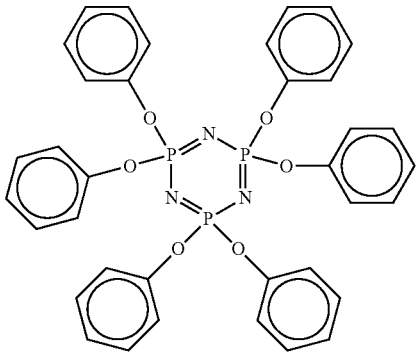

Phenoxyphosphazene (ring structure)

The varnish composition further has composition (E): fillers which can be fuse silica (commercial product: MEGASIL 525) to reduce the Dk/Df value of the prepreg. the filler (E) may comprise spherical silica materials to reduce hardness of the varnish composition and thus improve drill bit friendliness during manufacturing process. The fillers alternatively can be aluminum silicate for better cracking-prevention. Further, the fillers can be $SiO_2$ having small diameter (of about 2 um, such as commercial product: Siltech G2-C) with Mohs hardness of less than 5 to further improve drill bit friendliness.

The following experiments are shown and the compositions of the varnish composition are discussed.

TABLE 1

| Compositions | compound | E1 | E2 | E3 | E4 |
|---|---|---|---|---|---|
| (A-1) (wt %) | DOPO-CNE | 32 | 32 | 32 | 32 |
| | DOPO-HQ-Si-CNE | | | | |
| | DOPO-HQ-CNE | | | | |
| | DOPO-NQCNE | | | | |

TABLE 1-continued

| Compositions | compound | E1 | E2 | E3 | E4 |
|---|---|---|---|---|---|
| (A-2)~(A-4) (wt %) | DNE | 11 | 11 | 11 | 11 |
| | RD62 | | | | |
| | Oxazolidone Epoxy Resin | 11 | 11 | 11 | 11 |
| (B) (wt %) | Bz | 34 | 34 | 34 | 34 |
| | SMAEF30 | 12 | | | |
| | SMAEF40 | | 12 | | |
| | SMAEF60 | | | 12 | |
| | SMAEF80 | | | | 12 |
| (D) (phr) | Aromatic polyphosphate | 25 | 25 | 25 | 25 |
| | Phosphazene | | | | |
| | Melamine polyphosphate | | | | |
| | Diethyl phosphinic acid, aluninium salt | | | | |
| (E) (phr) | fuse silica | 44 | 44 | 44 | 44 |
| | aluminum silicate | 11 | 11 | 11 | 11 |
| (C) (phr) | 2E4MI | 0.035 | 0.035 | 0.035 | 0.035 |
| Properties of substrate | | | | | |
| Tg (DSC), ° C. | | 153 | 152 | 145 | 140 |
| Dk (1 GHz) | | 3.98 | 3.96 | 3.94 | 3.9 |
| Df (1 GHz) | | 0.006 | 0.006 | 0.005 | 0.005 |
| Punch (machining) | | ○ | ○ | ○ | ○ |
| Float 288° C., sec (with Cu) | | 15 | 15 | 14 | 13 |

In Examples 1-4 of Table. 1, SMA with different molecule weights are tested for the properties of prepreg/substrate. In Table. 1, the term of SMAEF30 means SMA with the smallest molecule weight and the term of SMAEF80 means SMA with the largest molecule weight. According to Table. 1, the added SMA has the larger molecular weight, the Tg, Df/Dk of the manufactured substrate are smaller.

The compositions of Examples 1, 5-7 are shown in Table. 2:

TABLE 2

| Compositions | compound | E1 | E5 | E6 | E7 |
|---|---|---|---|---|---|
| (A-1) (wt %) | DOPO-CNE | 32 | | | |
| | DOPO-HQ-Si-CNE | | 32 | | |
| | DOPO-HQ-CNE | | | 32 | |
| | DOPO-NQ-CNE | | | | 32 |
| (A-2)~(A-4) (wt %) | DNE | 11 | 11 | 11 | 11 |
| | Naphthalene alkyl Epoxy Resin | | | | |
| | Oxazolidone Epoxy Resin | 11 | 11 | 11 | 11 |
| (B) (wt %) | Bz | 34 | 34 | 34 | 34 |
| | SMAEF30 | 12 | 12 | 12 | 12 |
| | SMAEF40 | | | | |
| | SMAEF60 | | | | |
| | SMAEF80 | | | | |
| (D) (phr) | Aromatic polyphosphate | 25 | 25 | 25 | 25 |
| | Phosphazene | | | | |
| | Melamine polyphosphate | | | | |
| | Diethyl phosphinic acid, aluninium salt | | | | |
| (E) (phr) | fuse silica | 44 | 44 | 44 | 44 |
| | aluminum silicate | 11 | 11 | 11 | 11 |
| (C) (phr) | 2E4MI | 0.035 | 0.035 | 0.035 | 0.035 |

TABLE 2-continued

| Compositions | compound | E1 | E5 | E6 | E7 |
|---|---|---|---|---|---|
| Properties of substrate | | | | | |
| Tg (DSC), °C. | | 153 | 170 | 145 | 157 |
| Dk (1 GHz) | | 3.98 | 4.13 | 4.20 | 4.30 |
| Df (1 GHz) | | 0.006 | 0.009 | 0.009 | 0.009 |
| Punch (machining) | | ○ | ○ | ○ | ○ |
| T-288° C., min (with Cu) | | 15 | >60 | 16 | 16 |

In Examples 1, 5-7 of Table. 2, composition A-1 with different molecular structures and with different compositions are tested for the properties of prepreg/substrate. According to Table. 2, the added composition A-1 with P-containing structure or P-containing/Si-containing structure results in the different Tg, Df/Dk of the manufactured substrate. However, the shown results of the manufactured prepreg/substrate meet the requirements of products.

The compositions of Examples 1, 8-10 are shown in Table. 3:

TABLE 3

| Compositions | compound | E1 | E8 | E9 | E10 |
|---|---|---|---|---|---|
| (A-1) (wt %) | DOPO-CNE | 32 | 32 | 32 | 32 |
| | DOPO-HQ-Si-CNE | | | | |
| | DOPO-HQ-CNE | | | | |
| | DOPO-NQ-CNE | | | | |
| (A-2)~(A-4) (wt %) | DNE | 11 | 11 | 11 | 11 |
| | Naphthalene alkyl Epoxy Resin | | | | |
| | Oxazolidone Epoxy Resin | 11 | 11 | 11 | 11 |
| (B) (wt %) | Bz | 34 | 34 | 34 | 34 |
| | SMAEF30 | 12 | 12 | 12 | 12 |
| | SMAEF40 | | | | |
| | SMAEF60 | | | | |
| | SMAEF80 | | | | |
| (D) (phr) | Aromatic polyphosphate | 25 | | | |
| | Phosphazene | | 25 | | |
| | Melamine polyphosphate | | | 25 | |
| | Diethyl phosphinic acid, aluninium salt | | | | 25 |
| (E) (phr) | fuse silica | 44 | 44 | 44 | 44 |
| | aluminum silicate | 11 | 11 | 11 | 11 |
| (C) (phr) | 2E4MI | 0.035 | 0.035 | 0.035 | 0.035 |
| Properties of substrate | | | | | |
| Tg (DSC), °C. | | 153 | 160 | 140 | 171 |
| Dk (1 GHz) | | 3.98 | 4.00 | 4.30 | 4.15 |
| Df (1 GHz) | | 0.006 | 0.009 | 0.010 | 0.010 |
| Punch (machining) | | ○ | ○ | ○ | ○ |
| T-288° C., min (with Cu) | | 15 | 15 | 0 | 2 |

In Examples 1, 8-10 of Table. 3, compositions D with different molecular structures are tested for the properties of prepreg/substrate. According to Table. 3, the added composition D with various molecular structures results in the different Tg, Df/Dk of the manufactured substrate. However, the shown results of the manufactured prepreg/substrate meet the requirements of products.

The compositions of Examples 1, 13-15, 18 are shown in Table. 3:

TABLE 4

| Compositions | compound | E1 | E13 | E14 | E15 | E18 |
|---|---|---|---|---|---|---|
| (A-1) (wt %) | DOPO-CNE | 32 | 32 | 32 | 32 | 54 |
| | DOPO-HQ-Si-CNE | | | | | |
| | DOPO-HQ-CNE | | | | | |
| | DOPO-NQ-CNE | | | | | |
| (A-2)~(A-4) (wt %) | DNE | 11 | 22 | | | |
| | Naphthalene alkyl Epoxy Resin | | | 22 | | |
| | Oxazolidone Epoxy Resin | 11 | | | 22 | |
| (B) (wt %) | Bz | 34 | 34 | 34 | 34 | 34 |
| | SMAEF30 | 12 | 12 | 12 | 12 | 12 |
| | SMAEF40 | | | | | |
| | SMAEF60 | | | | | |
| | SMAEF80 | | | | | |
| (D) (phr) | Aromatic polyphosphate | 25 | 25 | 25 | 25 | 25 |
| | Phosphazene | | | | | |
| | Melamine polyphosphate | | | | | |
| | Diethyl phosphinic acid, aluninium salt | | | | | |
| (E) (phr) | fuse silica | 44 | 44 | 44 | 44 | 44 |
| | aluminum silicate | 11 | 11 | 11 | 11 | 11 |
| (C) (phr) | 2E4MI | 0.035 | 0.035 | 0.035 | 0.035 | 0.035 |
| Properties of substrate | | | | | | |
| Tg (DSC), °C. | | 153 | 153 | 154 | 156 | 157 |
| Dk (1 GHz) | | 3.98 | 3.96 | 4.04 | 4.01 | 4.10 |
| Df (1 GHz) | | 0.006 | 0.006 | 0.008 | 0.008 | 0.008 |
| Punch (machining) | | ○ | Δ | Δ | ○ | Δ |
| T-288° C., min (with Cu) | | 15 | 10 | 18 | 16 | 4 |

In Examples 1, 13-15, 18 of Table. 4, compositions A-2 to A-4 are tested for the properties of prepreg/substrate. According to Table. 4, the added compositions A-2 to A-4 with various compounds results in the different Df/Dk, anti-flammability and machining characteristic of the manufactured substrate. However, the shown results of the manufactured prepreg/substrate meet the requirements of products.

The compositions of Examples 1, 16-17 are shown in Table. 5:

TABLE 5

| Compositions | compound | E1 | E16 | E17 |
|---|---|---|---|---|
| (A-1) (wt %) | DOPO-CNE | 32 | 32 | 32 |
| | DOPO-HQ-Si-CNE | | | |
| | DOPO-HQ-CNE | | | |
| | DOPO-NQ-CNE | | | |

TABLE 5-continued

| Compositions | compound | E1 | E16 | E17 |
|---|---|---|---|---|
| (A-2)~(A-4) (wt %) | DNE | 11 | 11 | 11 |
| | Naphthalene alkyl Epoxy Resin | | | |
| | Oxazolidone Epoxy Resin | 11 | 11 | 11 |
| (B) (wt %) | Bz | 34 | 34 | 34 |
| | SMAEF30 | 12 | 12 | 12 |
| | SMAEF40 | | | |
| | SMAEF60 | | | |
| | SMAEF80 | | | |
| (D) (phr) | Aromatic polyphosphate | 25 | 25 | 25 |
| | Phosphazene | | | |
| | Melamine polyphosphate | | | |
| | Diethyl phosphinic acid, aluninium salt | | | |
| (E) (phr) | fuse silica | | 44 | 55 |
| | aluminum silicate | | 11 | 55 |
| (C) (phr) | 2E4MI | 0.035 | 0.035 | 0.035 |
| Properties of substrate | | | | |
| Tg (DSC), ° C. | | 153 | 153 | 154 |
| Dk (1 GHz) | | 3.98 | 3.97 | 4.28 |
| Df (1 GHz) | | 0.006 | 0.006 | 0.009 |
| Punch (machining) | | ○ | ○ | ○ |
| T-288° C., min (with Cu) | | 15 | 16 | 12 |

In Examples 1, 16-17 of Table. 5, fillers of composition E are tested for the properties of prepreg/substrate. According to Table. 5, the added composition E with various fillers results in the different Df/Dk of the manufactured substrate. However, the shown results of the manufactured prepreg/substrate meet the requirements of products.

The compositions of Examples 1, 11-12 are shown in Table. 6:

TABLE 6

| Compositions | compound | E1 | E11 | E12 |
|---|---|---|---|---|
| (A-1) (wt %) | DOPO-CNE | 32 | 16 | 16 |
| | DOPO-HQ-Si-CNE | | 16 | 16 |
| | DOPO-HQ-CNE | | | |
| | DOPO-NQ-CNE | | | |
| (A-2)~(A-4) (wt %) | DNE | 11 | 11 | 11 |
| | Naphthalene alkyl Epoxy Resin | | | |
| | Oxazolidone Epoxy Resin | 11 | 11 | 11 |
| (B) (wt %) | Bz | 34 | 34 | 34 |
| | SMAEF30 | 12 | | |
| | SMAEF40 | | | |
| | SMAEF60 | | 12 | 12 |
| | SMAEF80 | | | |
| (D) (phr) | Aromatic polyphosphate | 25 | 25 | 12.5 |
| | Phosphazene | | | 12.5 |
| | Melamine polyphosphate | | | |
| | Diethyl phosphinic acid, aluninium salt | | | |
| (E) (phr) | fuse silica | 44 | 44 | 44 |
| | aluminum silicate | 11 | 11 | 11 |
| (C) (phr) | 2E4MI | 0.035 | 0.035 | 0.035 |
| Properties of substrate | | | | |
| Tg (DSC), ° C. | | 153 | 165 | 170 |
| Dk (1 GHz) | | 3.98 | 4.0 | 4.0 |
| Df (1 GHz) | | 0.006 | 0.006 | 0.008 |
| Punch (machining) | | ○ | ○ | ○ |

TABLE 6-continued

| Compositions | compound | E1 | E11 | E12 |
|---|---|---|---|---|
| T-288° C., min (with Cu) | | 15 | >60 | >60 |

In preferable Examples 1, 11-12 of Table. 6, SMA mixed with Bz, phosphorus-containing and silicon-containing epoxy resin, and phosphorus-containing flame retardant are used to obtain the prepreg/substrate with balanced properties.

The compositions of Examples 1, 19-20 are shown in Table. 7:

TABLE 7

| Compositions | compound | E1 | E19 | E20 |
|---|---|---|---|---|
| (A-1) (wt %) | DOPO-CNE | 32 | 27 | 27 |
| | DOPO-HQ-Si-CNE | | 16 | 16 |
| | DOPO-HQ-CNE | | | |
| | DOPO-NQ-CNE | | | |
| (A-2)~(A-4) (wt %) | DNE | 11 | 9 | 12 |
| | Naphthalene alkyl Epoxy Resin | | | |
| | Oxazolidone Epoxy Resin | 11 | 9 | 12 |
| (B) (wt %) | Bz | 34 | 42 | 29 |
| | SMAEF30 | 12 | 14 | 10 |
| | SMAEF40 | | | |
| | SMAEF60 | | 12 | 12 |
| | SMAEF80 | | | |
| (D) (phr) | Aromatic polyphosphate | 25 | 25 | 25 |
| | Phosphazene | | | |
| | Melamine polyphosphate | | | |
| | Diethyl phosphinic acid, aluninium salt | | | |
| (E) (phr) | fuse silica | 44 | 44 | 44 |
| | aluminum silicate | 11 | 11 | 11 |
| (C) (phr) | 2E4MI | 0.035 | 0.035 | 0.035 |
| Properties of substrate | | | | |
| Tg (DSC), ° C. | | 153 | 155 | 154 |
| Dk (1 GHz) | | 3.98 | 3.97 | 3.96 |
| Df (1 GHz) | | 0.006 | 0.006 | 0.006 |
| Punch (machining) | | ○ | Δ | ○ |
| T-288° C., min (with Cu) | | 15 | 10 | 10 |

Examples 1, 19, 20 are provided for discussing the different EP/OH equivalent molar ratio, which is the ratio of epoxy mole equivalent and OH mole equivalent. The EP/OH equivalent molar ratio of Examples 1, 19, 20 are respectively about 0.9, 0.6, and 1.2. However, the EP/OH equivalent molar ratio does not take much influence to the prepreg/substrate. In detail, the epoxy mole equivalent is calculated that the weight of epoxy is divided by weight of varnish composition solid content, and similarly, the OH mole equivalent is calculated that the OH equivalent is divided by weight of varnish composition solid content. In other words, the EP/OH equivalent molar ratio is calculated by that the amount of composition A is divided by the amount of composition B. According to this definition, the EP/OH equivalent molar ratios of the above-mentioned Examples, 1 to 20 are between about 0.6 and 1.2.

The compositions of Examples 1, 21-24 are shown in Table. 8:

TABLE 8

| Compositions | compound | E1 | E21 | E22 | E23 | E24 |
|---|---|---|---|---|---|---|
| (A-1) (wt %) | DOPO-CNE | 32 | 32 | 32 | 32 | 54 |
| | DOPO-HQ-Si-CNE | | | | | |
| | DOPO-HQ-CNE | | | | | |
| | DOPO-NQ-CNE | | | | | |
| (A-2)~(A-4) (wt %) | DNE | 11 | 11 | 11 | 11 | 11 |
| | Naphthalene alkyl Epoxy Resin | | | | | |
| | Oxazolidone Epoxy Resin | 11 | 11 | 11 | 11 | 11 |
| (B) (wt %) | Bz | 34 | 34 | 34 | 34 | 34 |
| | SMAEF30 | 12 | 12 | 12 | 12 | 12 |
| | SMAEF40 | | | | | |
| | SMAEF60 | | | | | |
| | SMAEF80 | | | | | |
| (D) (phr) | Aromatic polyphosphate | 25 | 25 | 25 | 25 | 25 |
| | Phosphazene | | | | | |
| | Melamine polyphosphate | | | | | |
| | Diethyl phosphinic acid, aluninium salt | | | | | |
| (E) (phr) | fuse silica | 44 | 0 | 11 | 26 | 68 |
| | aluminum silicate | 11 | 0 | 3 | 6 | 17 |
| (C) (phr) | 2E4MI | 0.035 | 0.035 | 0.035 | 0.035 | 0.035 |
| Properties of substrate | | | | | | |
| Tg (DSC), ° C. | | 153 | 155 | 157 | 156 | 151 |
| Dk (1 GHz) | | 3.98 | 3.87 | 3.91 | 3.95 | 4.10 |
| Df (1 GHz) | | 0.006 | 0.005 | 0.005 | 0.006 | 0.006 |
| Punch (machining) | | ○ | ○ | ○ | ○ | Δ |
| T-288° C., min (with Cu) | | 15 | 2 | 5 | 7 | 19 |

In Examples 1, 21-24 of Table. 8, fillers of composition E are tested for the properties of prepreg/substrate. According to Table. 8, the more the fillers of composition E are added, the anti-flammability of the prepreg/substrate is higher. However, the prepreg/substrate has high Dk. The shown results of the manufactured prepreg/substrate meet the requirements of products.

According to the above-mentioned results, the varnish composition of the preferable embodiment has that: composition (A-1) is P-containing epoxy resin about 27-37% (weight percentage); the sum weight percentage of composition (A-2)-(A-4) is about 18-24%; composition (B) is Bz resin about 29-42%; composition (C) is SMA about 10-14%; the phosphorus-containing flame retardant of composition (D) is at least 25 phr; and the fillers of composition (E) is about 0-85 phr.

A method for manufacturing a prepreg using the varnish composition is disclosed in the present disclosure. The varnish composition is provided and the varnish composition has composition (A): an epoxy resin, (B): a hardener, composition (C): an accelerator, composition (D): phosphorus-containing flame retardant and composition (E): composite fillers. Composition (A) includes composition (A-1): phosphorus-containing epoxy resin, phosphorus-containing and silicon-containing epoxy resin, or a mixture thereof; composition (A-2): dicyclopentadiene epoxy resin; and composition (A-3): oxazolidone epoxy resin. The glass fabrics are dipped into the varnish composition so as to manufacture a prepreg, PP, or copper clad laminate (CCL) with high anti-flammability and toughness properties. The above-mentioned prepregs are applied for manufacturing the substrate of PCB, and the substrate has improved physical and chemical properties. For example, the substrate has improved reactivity while laminating.

In summary,

1. The P-containing epoxy, P-containing and Si-containing epoxy, or the mixture thereof is used to be combined with another epoxy resin as the main epoxy resin. The main epoxy resin is mixed with SMA to form the varnish composition of the present invention. The prepreg manufactured by dipping the glass fiber into the varnish composition has improved the properties of heat-resistance, anti-flammability, and low moisture absorption, and the substrate manufactured by laminating the prepregs has improved and balanced properties.

2. The varnish composition has fillers added therein so that the prepreg/substrate can be applied to high frequency application.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A varnish composition comprising:
   composition (A): an epoxy resin including:
      composition (A-1): a phosphorus containing epoxy resin, a phosphorus and silicon containing epoxy resin, or a mixture thereof;
      composition (A-2): dicyclopentadiene epoxy resin; and
      composition (A-3): oxazolidone epoxy resin;
   composition (B): a hardener, wherein the hardener of composition (B) is a polymer of styrene and maleic acid anhydride, a benzoxazine resin, or a mixture thereof;
   composition (C): an accelerant;
   composition (D): phosphorus-containing flame retardant; and
   composition (E): fillers,
   wherein the dicyclopentadiene epoxy resin of composition (A-2) is shown as formula 4:

formula 4

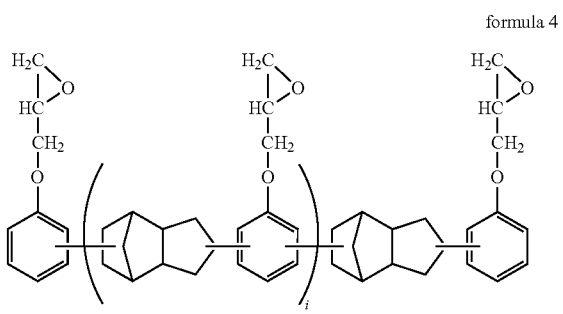

wherein "i" represents a number of repeat units.

2. A prepreg prepared by applying the varnish composition of claim 1 to a composite fabric.

3. A substrate of printed circuit board prepared by laminating the prepreg of claim 2.

4. The varnish composition according to claim 1, wherein the phosphorus-containing epoxy resin of composition (A-1) is an epoxy resin formed with a phosphorus-containing reactant selected from the group consisting of formula 1, formula 2, and formula 3 as listed below:

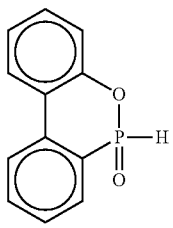

formula 1

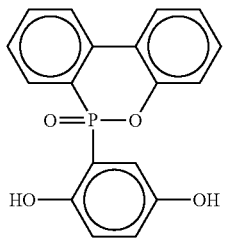

formula 2

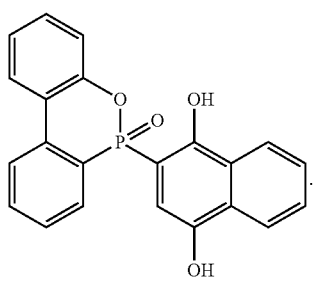

formula 3

5. The varnish composition according to claim 1, wherein the phosphorus and silicon containing epoxy resin of composition (A-1) is an epoxy resin formed with a silicon-containing reactant and a phosphorus-containing reactant selected from the group consisting of formula 1, formula 2, and formula 3 as listed below:

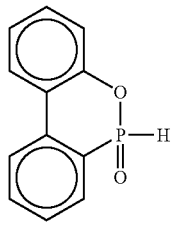

formula 1

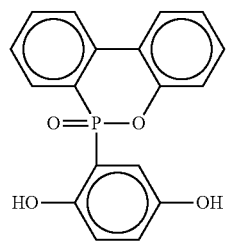

formula 2

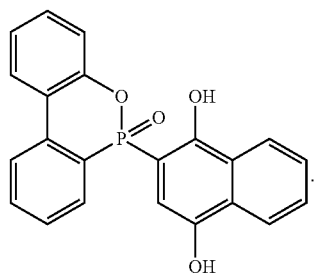

formula 3

6. The varnish composition according to claim 1, wherein the oxazolidone epoxy resin of composition (A-3) is shown as formula 5:

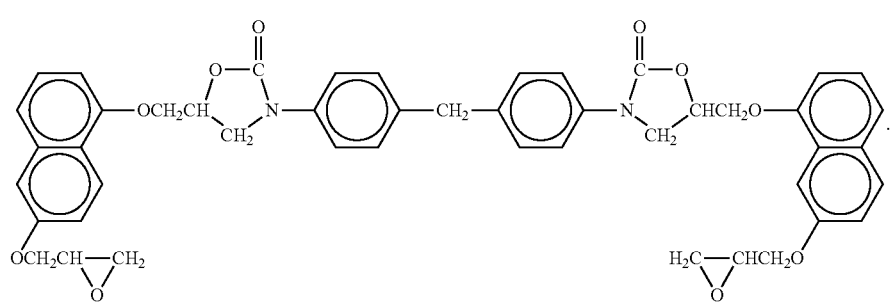

Formula 5

7. The varnish composition according to claim 1, wherein the composition (A) further includes composition (A-4): naphthalene epoxy resin.

8. The varnish composition according to claim 7, wherein the naphthalene epoxy resin of composition (A-4) is shown as formula 6:

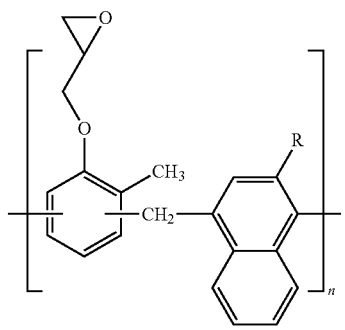

formula 6 wherein "n" represents a number of repeat units.

9. The varnish composition according to claim 1, wherein the benzoxazine resin of composition (B) is shown as formula 7:

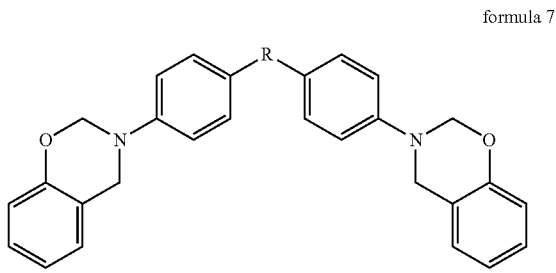

formula 7 wherein "R" is a composition selected from the group consisting of S, CH2,

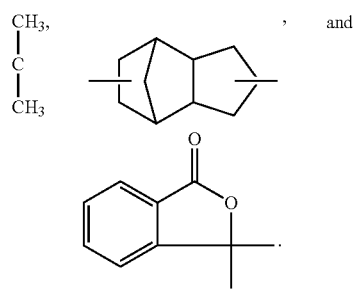

and

* * * * *